United States Patent [19]
Sebben et al.

[11] Patent Number: 5,145,019
[45] Date of Patent: Sep. 8, 1992

[54] VEHICLE IMPLEMENT DRIVE CONFIGURATION

[75] Inventors: Daniel A. Sebben, West Bend; Wayne R. Hutchison, Mayville; Jon M. Patterson, Wauwatosa, all of Wis.

[73] Assignee: Deere & Company, Moline, Ill.

[21] Appl. No.: 715,175

[22] Filed: Jun. 14, 1991

[51] Int. Cl.⁵ .................... B60K 5/00; B60K 17/02
[52] U.S. Cl. .................... 180/62; 180/375; 180/292; 180/900; 180/905; 56/11.3; 56/11.7; 56/DIG. 6; 74/606 R
[58] Field of Search ............ 180/53.7, 56, 62, 374, 180/375, 292, 294, 900, 905; 56/11.3, 11.5, 11.7, 14.7, 16.7, DIG. 6; 74/606 R

[56] References Cited

U.S. PATENT DOCUMENTS

| | | | |
|---|---|---|---|
| 4,311,204 | 1/1982 | Shupert | 56/14.7 X |
| 4,679,382 | 7/1987 | Saruhashi et al. | 56/14.7 X |
| 4,727,768 | 3/1988 | Hayashi et al. | 74/606 R X |
| 4,969,319 | 11/1990 | Hutchison et al. | 56/14.7 |
| 4,979,583 | 12/1990 | Thoma et al. | 180/62 |

FOREIGN PATENT DOCUMENTS

| | | | |
|---|---|---|---|
| 934686 | 11/1955 | Fed. Rep. of Germany | 180/62 |
| 0160622 | 9/1984 | Japan | 180/374 |
| 60227 | 2/1912 | Switzerland | 180/62 |

OTHER PUBLICATIONS

Deere & Company, John Deere Service Manual 4M9;P046 160187, pp. 46, 47 and 53, prior to 1990, published in U.S.A.
Deere & Company, John Deere Riding Mowers, 8 pages, 1990, published in U.S.A.

Primary Examiner—Andres Kashnikow
Assistant Examiner—Brian L. Johnson

[57] ABSTRACT

An engine-transaxle-belt drive configuration is provided for a lawn and garden rear engine vehicle. The transaxle housing has been adapted to receive the engine drive pulley and electric clutch in order to lower the engine mounting and vehicle center of gravity. A releasable fastening structure is provided to facilitate clutch movement and removal of the transmission and implement drive belts.

9 Claims, 6 Drawing Sheets

VEHICLE IMPLEMENT DRIVE CONFIGURATION

BACKGROUND OF THE INVENTION

1. Field of the Invention

The present invention relates to vehicles equipped with a rear engine, such as are often utilized in lawn and garden tractor applications, and more specifically to an engine-transaxle-drive belt configuration intended to minimize the angle of drive belt misalignment between the engine and implement pulleys.

2. Description of the Related Art

Lawn and garden vehicles often position the engine in the rear and over the drive wheels to improve the traction of the vehicle. These engines are typically positioned over the transaxle within which a differential and transmission is housed to drive the rear wheels.

Such vehicles are generally utilized for grass mowing operations and thereby carry an implement, such as a mower, either at the vehicle's rear, front or between the front and rear wheels. The implements are commonly powered by belt drives which couple the engine drive shaft with the implement input shaft.

Implements, such as mower decks, are adapted to operate a desired distance above the ground and accordingly will float or move relative to the vehicle as they follow the ground level. As they float, the drive belt will move through an angle above and below the ideal drive path between the drive pulley and driven pulley which, if too great, can result in excessive belt wear. This range of angular operation outside the desired path is commonly referred to as the angle of misalignment.

When the engine is located directly above the rear axle, the mower drive pulley and belt must be located above or below the axle housing which positions it such that excessive belt misalignment angles with the implement can occur. When a transaxle is utilized, that is a combined transmission-differential-axle unit, a larger housing is necessary and the mower drive pulley must be located even higher relative to the pulley on the implement, thereby creating the potential for an even greater belt misalignment between the drive and driven pulleys.

It would accordingly be desirable to be able to locate the engine drive pulley at a position generally aligned with the mid-range of operation of the implement's driven pulley and thereby minimize belt misalignment which can occur as the implement floats over changing ground contours or the cutting height is adjusted.

It would also be desirable to provide an implement belt drive arrangement which can accommodate an electric clutch and yet minimize drive belt alignment.

It would further be desirable to provide such a belt drive arrangement which permits quick and easy belt replacement.

SUMMARY OF THE INVENTION

There is provided herein an engine transaxle configuration which permits the belt misalignment angle between the drive and driven pulleys to be minimized. Specifically, there is provided a transaxle housing configuration which permits the drive pulley carried by the engine crankshaft to be carried directly in front of the transaxle and nestled in an opening or recess configured in the transaxle housing. This is permitted through locating the differential in the transaxle to one side of the center line through the vehicle. The opening or recess is created on the front side of the transaxle housing at the crankshaft center line and provides clearance to lower the engine along with the mower drive sheave to optimize the drive belt angles with the implement drive pulley. Through lowering the engine, the center of gravity on the vehicle is additionally lowered, providing additional stability to the rear engine rider.

The opening in the transaxle housing further permits the location or addition of an electric clutch to the engine drive shaft for conveniently coupling the mower drive sheave or pulley with the engine crankshaft.

Further provided is a fastening structure between the transaxle housing and electric clutch for securing the electric clutch to the transaxle housing to prevent rotation of the clutch with the engine drive shaft. This fastening means takes the form of a releasable coupling which permits the electric clutch to be uncoupled from the transaxle housing and rotated to enable belt removal from the drive pulley and/or engine crankshaft as required for replacement and/or repair.

Through lowering the engine drive sheave, belt misalignment angles are optimized which permits an increase in the range of mower cutting height and float without exceeding the recommended limits for belt misalignment. Lowering of the engine also improves the center of gravity of the vehicle and therefore the stability of the vehicle.

The opening in the transaxle housing allows clearance to permit the mower drive sheave to be positioned at any height and facilitates flexibility for various mower deck options that may require different sheave heights in order to optimize the belt misalignment.

DESCRIPTION OF THE PREFERRED EMBODIMENT

Figure 1:
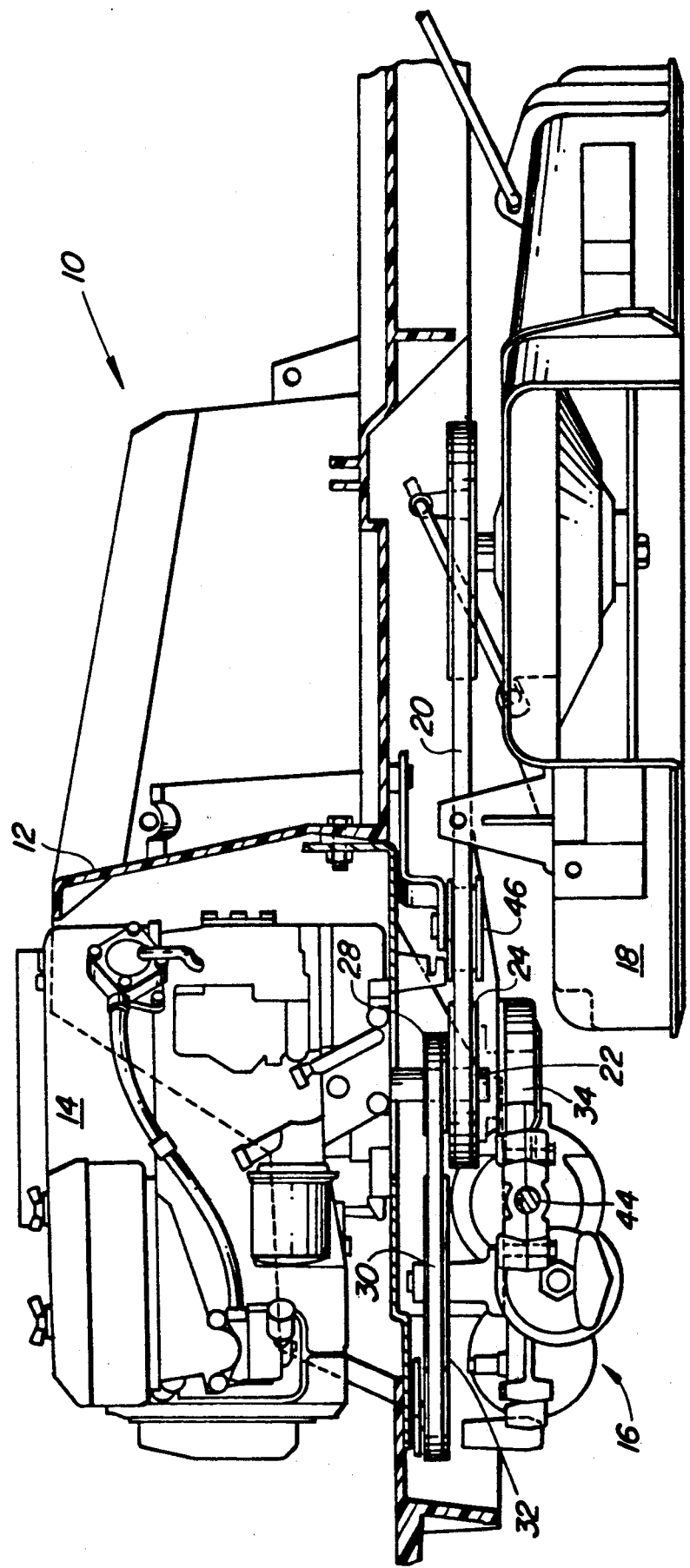
FIG. 1 is a partial view of a rear engine rider illustrating a lawn and garden vehicle frame, engine, transaxle, mower deck and belt drive arrangement between the engine and mower deck.

Looking first to FIG. 1, there is illustrated a cut-away view of a rear engine rider 10 including a frame member 12, an engine 14 carried at the rear of the frame 12, a transaxle 16 and a mower deck 18. A drive-belt 20 couples the engine drive shaft 22, mower drive component on pulley 24 and mower driven pulley 26. Additionally, a second pulley component 28 carried on the engine drive shaft 22 has entrained about it a belt 30 which drives the transaxle transmission pulley 32.

Figure 2:
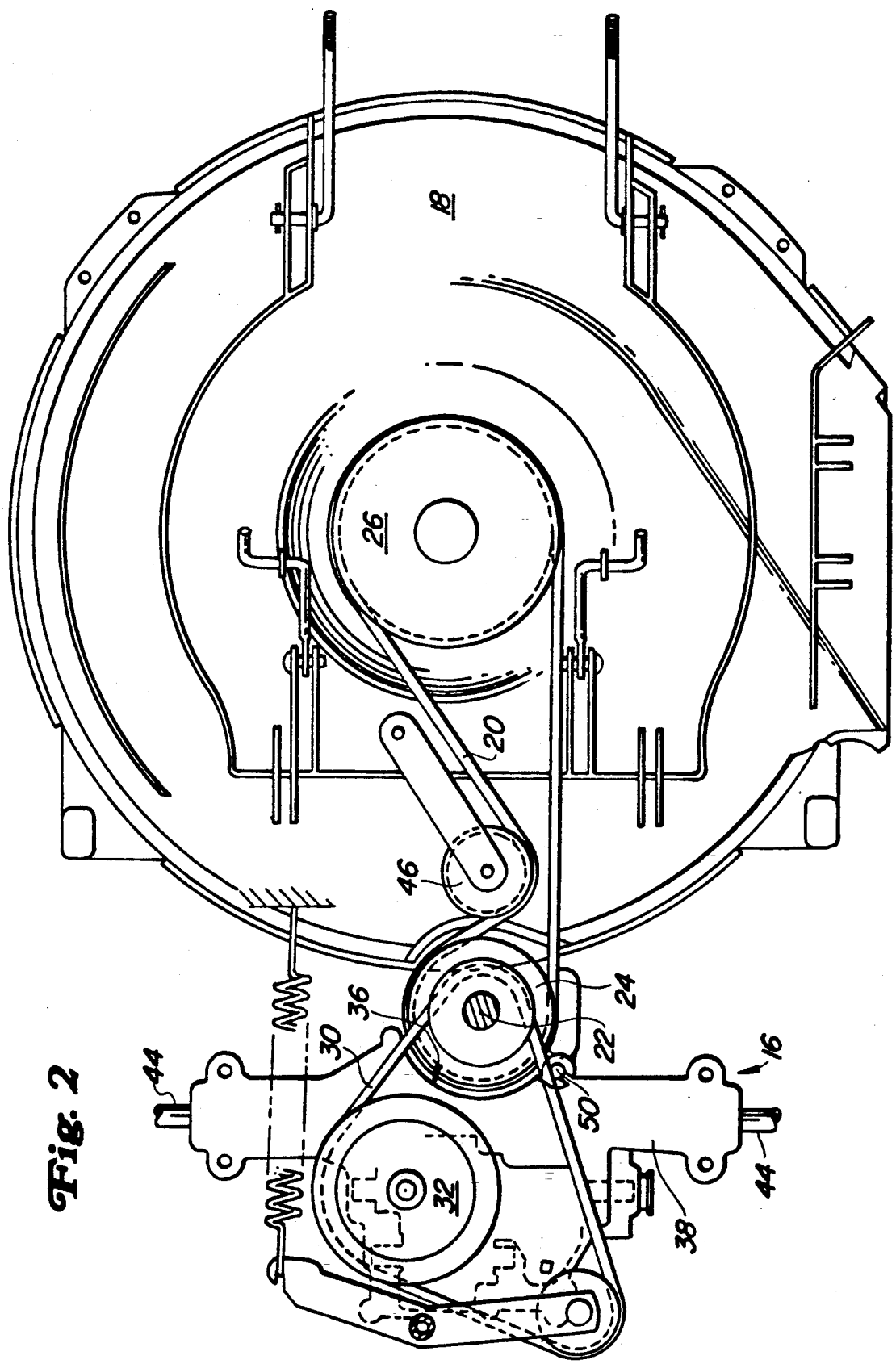
FIG. 2 is a plan view of the belt drive mechanisms between the engine crankshaft, the transaxle and mower deck.
Figure 3:
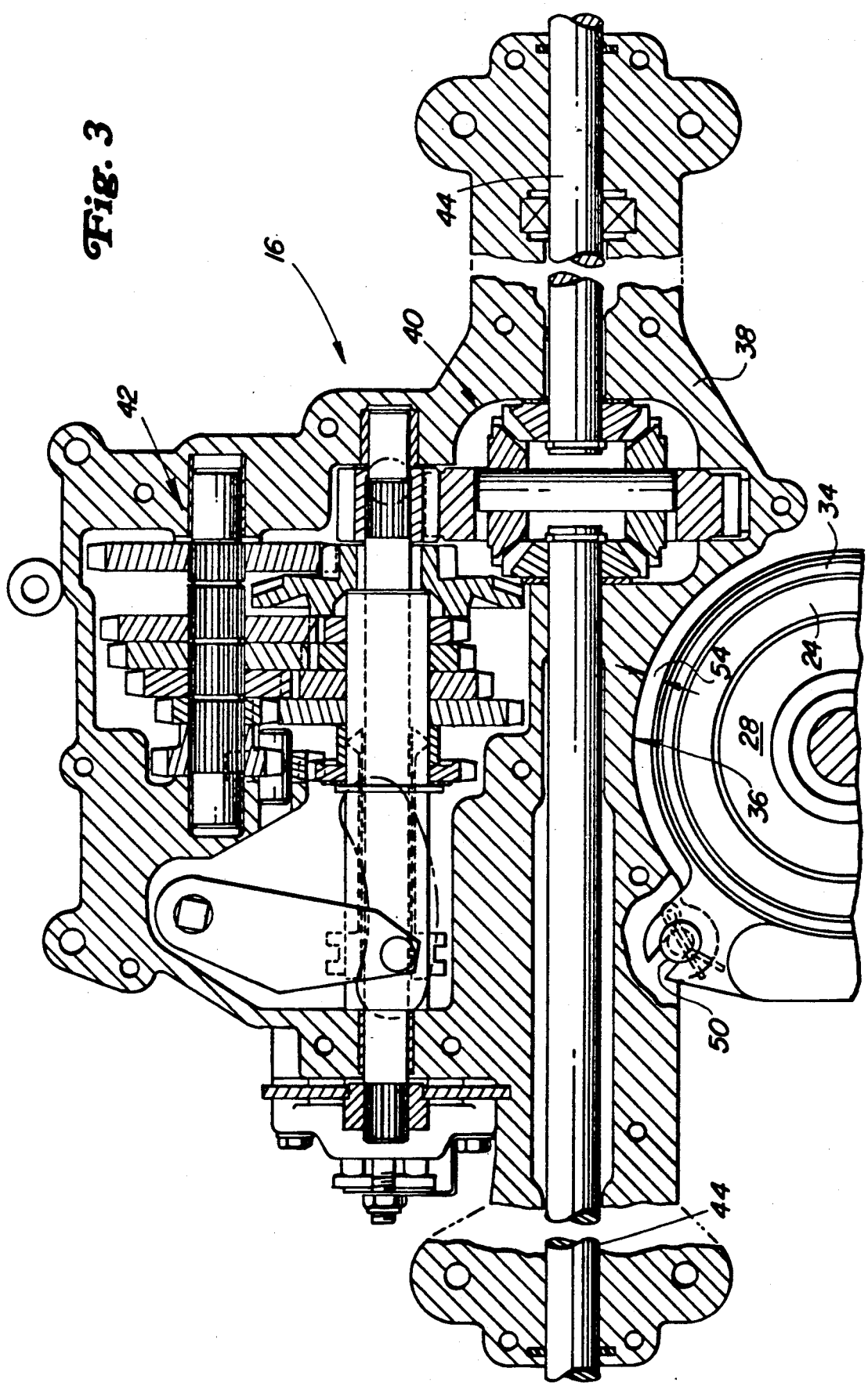
FIG. 3 is an enlarged schematic of the transaxle, its housing, the implement drive pulley and the electric clutch.

The downwardly projecting drive shaft 22 of the rear mounted engine 14 carries at its lower end an electric clutch component 34 nestled in an opening or recess 36 formed in the front of the transaxle housing 38 (see particularly FIGS. 2 and 3). The transaxle 16 includes a differential 40 positioned to one side of the recess 36 and a conventional transmission 42 carried in what would be the rearward portion of the transaxle housing 38. Left and right axles 44 project from the housing 38 and carry the left and right rear drive wheels for the vehicle 10.

Through positioning the differential 40 to one side in the housing 38, the front portion of the housing 38 has been adapted to receive the mower drive pulley 24 and/or electric clutch structure 34. This modification has also permitted the engine 14 to be mounted at a lower position on the frame 12 dropping the center of gravity and enhancing the stability of the vehicle 10.

As illustrated in FIG. 2, the belt 20 is entrained about the drive pulley 24, the driven pulley 26, and the spring loaded tensioning pulley 46. A similar drive belt 30 is entrained about the transaxle drive pulley 28 and the transaxle driven pulley 32 to power the transmission 42.

Figure 5:
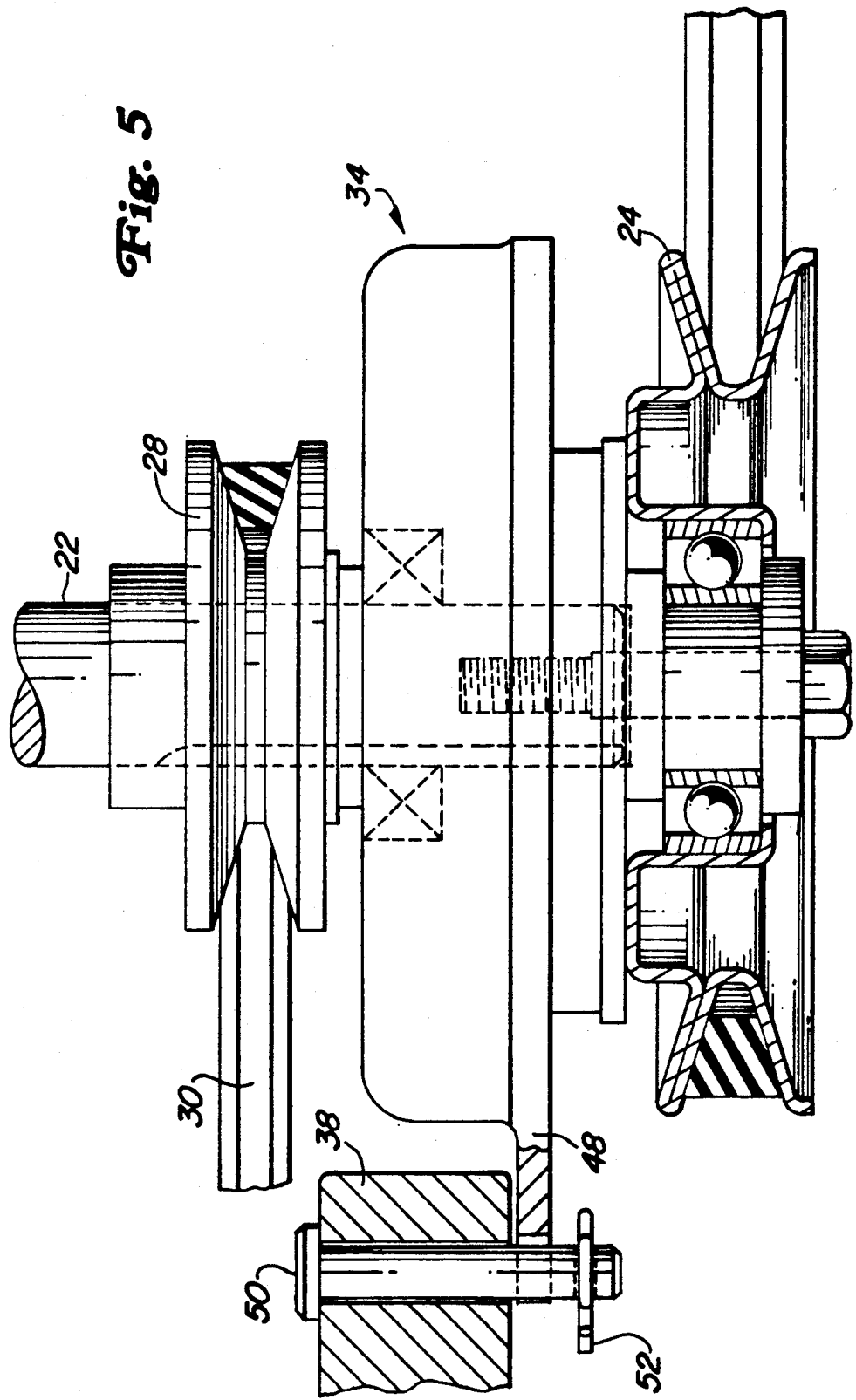
FIG. 5 is another enlarged schematic view similar to FIG. 5, but with the mower drive pulley being located on the engine crankshaft beneath the electric clutch.
Figure 6:
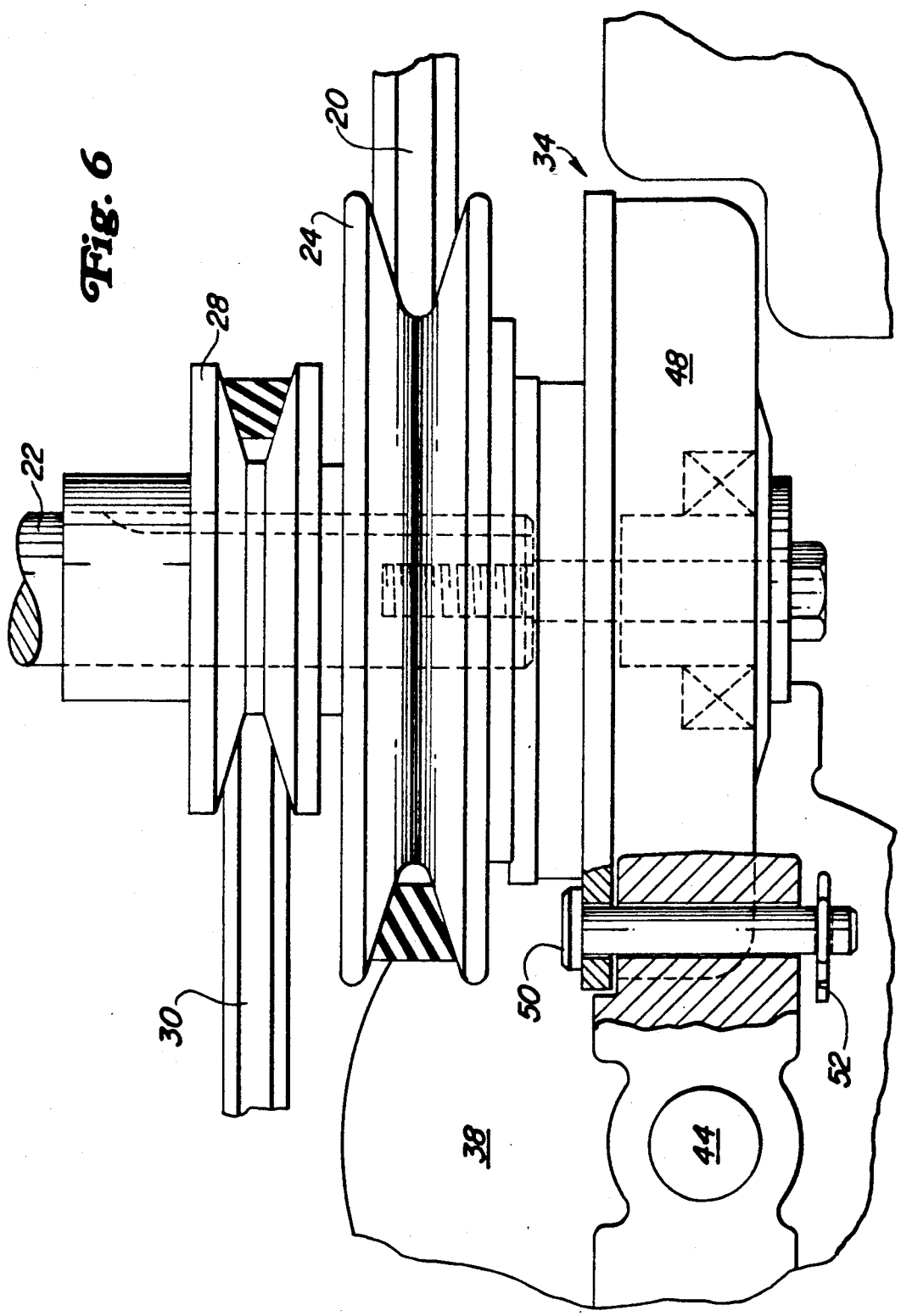
FIG. 6 is an enlarged schematic view of the engine crankshaft, transaxle drive pulley, engine drive pulley, electric clutch and fastening mechanism securing the electric clutch to the transaxle housing.

Looking now to FIGS. 5 and 6, there is illustrated in schematic form an enlarged view of the engine drive shaft 22, the transaxle drive pulley 28, the mower drive pulley 24 and electric clutch 34. FIGS. 5 and 6 illustrate alternate variations in mounting the mower drive pulley 24 either below or above the electric clutch 34 as may be preferred for a particular implement drive belt line of operation preference.

Looking first to the schematic of FIG. 5, it is noticed that the electric clutch 34 is nested within the transaxle recess 36 and includes a housing 48 which is fastened with the transaxle housing 38 through the use of the pin 50 and cotter key or quick pull pin 52. The clutch housing 48 would include a conventional electric clutch mechanism adapted to selectively couple the mower drive pulley 24 with the engine crankshaft 22 as desired. The clutch housing 48 would remain stationary, being fastened to the transaxle housing 38 through pin 50 and cotter key 52 while the clutch mechanism would be able to be electrically activated to rotate within the housing 48 and with the shaft 22 or free wheel on the shaft 22.

The transaxle drive pulley, identified by the number 28, is keyed to the engine crankshaft 22 and rotates continuously with the rotation of the engine crankshaft.

Looking now to FIG. 6 and the alternative arrangement, there is illustrated the crankshaft 22 with the mower drive pulley 24 mounted above the electric clutch 34. This arrangement positions the belt drive pulley 24 somewhat higher as may be desired when implements with higher input pulleys are used.

Figure 4:
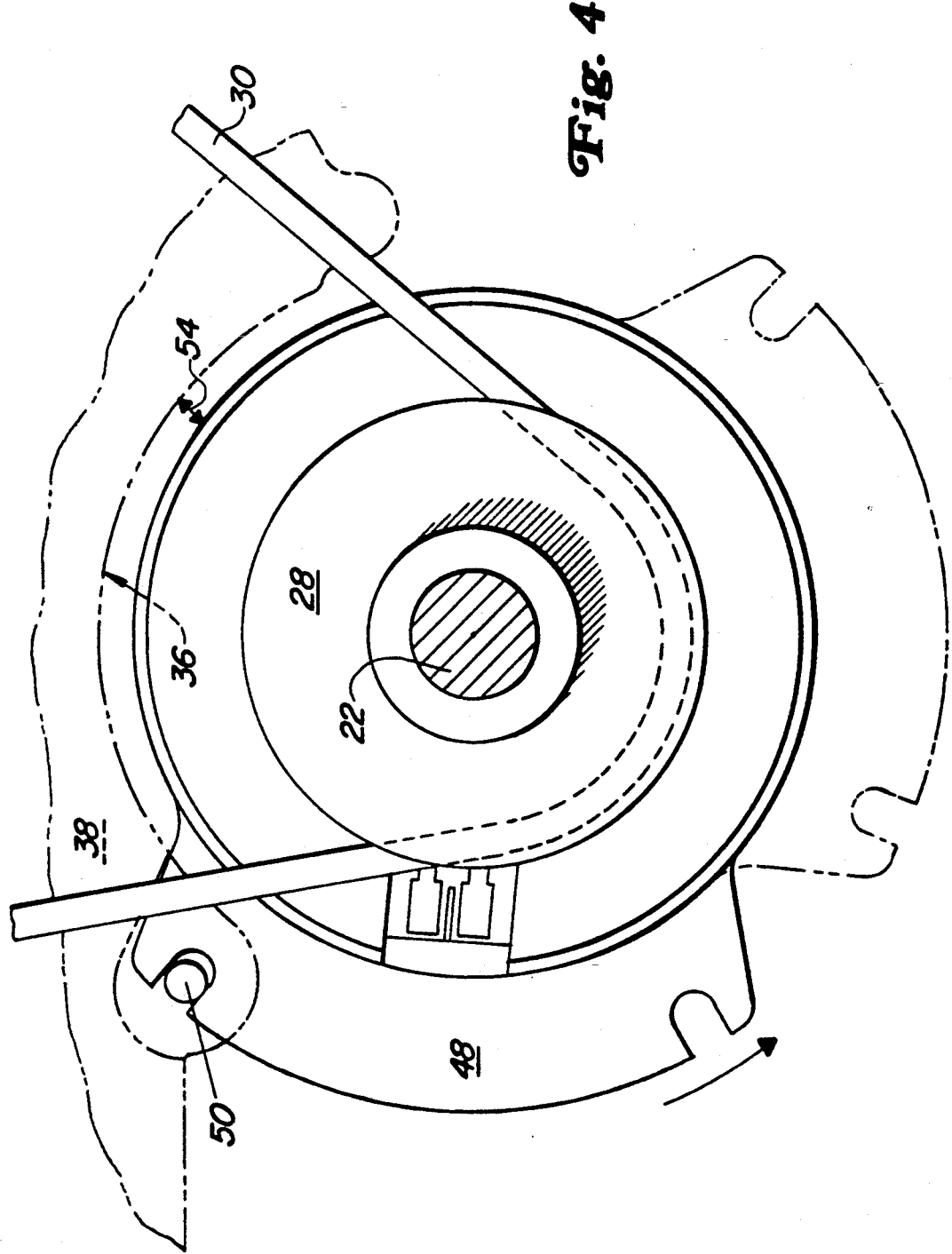
FIG. 4 is an enlarged partial view of the transaxle housing, transaxle drive pulley and electric clutch fastening mechanism, with the phantom lines illustrating the fastening mechanism in its rotated position to permit belt removal.

As illustrated in detail in FIGS. 3 and 4, the electric clutch 34 is nestled in the opening or forward recess 36 in the transaxle housing 38 and is pinned thereto by the vertically extending pin 50 held in place with the quick pull pin 52. A gap or space 54 is provided between the housing 38 and the electric clutch 34 or rear edge of the mower drive pulley 24 to permit the belt 20 to be passed through that gap 54. When an electric clutch 34 is utilized, the pin 50 must be removed or unfastened from its connection with the transaxle housing 38. As best illustrated in FIG. 4, the clutch housing 48 can be easily unfastened from the transaxle housing 38 after removal of the pin 50 by rotating the clutch housing 48 to the position illustrated by the phantom lines. The belt 20, after once having its tensioning device 46 released, could then be removed from the pulley 24, passed down and through the gap 54 over the bottom portion of the engine crank 22. Similarly, the transaxle transmission drive belt 30 could be removed through being passed through the gap 54 after the pin 50 has been removed and the clutch housing 48 rotated.

We claim:

1. In a vehicle adapted to propel an implement capable of vertical float relative to said vehicle, the implement having a driven pulley for powering the implement, said vehicle having front and rear wheels, a transaxle for driving the rear wheels, including a differential contained within one side portion of a transaxle housing, an engine carried at the rear portion of the vehicle and above the transaxle, the engine including a generally vertically oriented drive shaft projecting downwardly therefrom and having a drive component mounted thereon, the improvement comprising:

a recessed area in a front portion of the transaxle housing adapted to receive the drive component therein, and means extending between the drive shaft and the drive pulley for powering the implement.

2. The invention defined in claim 1 wherein the recess in the transaxle housing is adapted to receive an electric clutch component carried by the engine drive shaft.

3. The invention defined in claim 2 wherein fastening means is carried between the clutch component and the housing for releasably securing the clutch to the housing.

4. The invention defined in claim 3 wherein, the shaft carries a drive pulley above the clutch component and a space is maintained between the clutch component and housing whereby release of the fastening means permits rotation of the clutch component on the shaft and subsequent removal of a belt from the drive pulley and engine shaft.

5. The invention defined in claim 3 wherein the shaft further carries a second drive component in the form of a pulley spaced above the clutch component.

6. The invention defined in claim 3 wherein a drive pulley component is rotatably mounted on the drive shaft and the clutch component is adapted to selectively couple the drive pulley component for rotation with the shaft.

7. The invention defined in claim 6 wherein the drive pulley component is positioned above the clutch.

8. The invention defined in claim 6 wherein the drive pulley component is positioned below the clutch.

9. The invention defined in claim 2 wherein the clutch is positioned to one side of the differential contained in the transmission housing.

* * * * *

UNITED STATES PATENT AND TRADEMARK OFFICE
CERTIFICATE OF CORRECTION

PATENT NO. : 5,145,019

DATED : 8 September 1992

INVENTOR(S) : Daniel A. Sebben et al.

It is certified that error appears in the above-identified patent and that said Letters Patent is hereby corrected as shown below:

Column 4, line 32, delete "drive" and insert therefore --driven--

Column 4, line 38, after "clutch" insert --component--

Column 4, line 60, after "clutch" insert --component--

Signed and Sealed this

Twelfth Day of October, 1993

Attest:

BRUCE LEHMAN

Attesting Officer     Commissioner of Patents and Trademarks